United States Patent
Zhao et al.

(10) Patent No.: US 11,712,849 B2
(45) Date of Patent: *Aug. 1, 2023

(54) 3-D PRINTER

(71) Applicant: Nissan North America, Inc., Franklin, TN (US)

(72) Inventors: Nanzhu Zhao, Novi, MI (US); Jinwei Cao, New Hudson, MI (US); Nilesh Dale, Novi, MI (US); Sandeep Patil, Farmington Hills, MI (US); Cenk Gumeci, Northville, MI (US); Mohammed Hussain Abdul Jabbar, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/921,638

(22) Filed: Jul. 6, 2020

(65) Prior Publication Data

US 2022/0001612 A1 Jan. 6, 2022

(51) Int. Cl.
*B29C 64/245* (2017.01)
*B33Y 30/00* (2015.01)
(Continued)

(52) U.S. Cl.
CPC .......... *B29C 64/245* (2017.08); *B29C 64/135* (2017.08); *B29C 64/255* (2017.08);
(Continued)

(58) Field of Classification Search
CPC ... B29C 64/245; B29C 64/264; B29C 64/255; B29C 64/135; B33Y 10/00
(Continued)

(56) References Cited

U.S. PATENT DOCUMENTS 9,782,934 B2 10/2017 Willis et al.
10,016,938 B2 7/2018 DeSimone et al.
(Continued)

FOREIGN PATENT DOCUMENTS

WO WO-2017210298 A1 * 12/2017 ........... B29C 64/129
WO 2019059669 A1 3/2019

OTHER PUBLICATIONS

JO Bird and PJ Chivers, Newnes Engineering and Physical Science Pocket Book, 1993, Chapter 49 Measurement of Fluid Flow (Year: 1993).*

(Continued)

*Primary Examiner* — Leith S Shafi
*Assistant Examiner* — Xinwen Ye
(74) *Attorney, Agent, or Firm* — Global IP Counselors, LLP

(57) ABSTRACT

A method of operating a 3-D printer apparatus includes a tank structure with a bottom wall with a printing area defined above and spaced apart from the bottom wall. A gas permeable liquid within the tank overlays the bottom wall of the tank structure defining a first mobile layer below the printing area. An inhibition liquid within the tank overlays the gas permeable liquid defining a second mobile layer below the printing area. A polymerizable resin overlays the inhibition liquid and flows into the printing area. Positioning of an object carrier controlled such that a lower surface of the object carrier is initially located within the polymerizable resin and within the printing area. Operation of a resin curing device beneath the bottom wall provides light to the printing area polymerizing predetermined portions of the polymerizable resin forming an object attached to the lower surface of the object carrier.

16 Claims, 8 Drawing Sheets

(51) Int. Cl.
  *B29C 64/135*  (2017.01)
  *B29C 64/264*  (2017.01)
  *B29C 64/255*  (2017.01)
  *B33Y 40/00*   (2020.01)
  *B33Y 10/00*   (2015.01)

(52) U.S. Cl.
  CPC ............ *B29C 64/264* (2017.08); *B33Y 10/00* (2014.12); *B33Y 30/00* (2014.12); *B33Y 40/00* (2014.12)

(58) Field of Classification Search
  USPC .......................................................... 264/401
  See application file for complete search history.

(56) References Cited

U.S. PATENT DOCUMENTS

| | | | |
|---|---|---|---|
| 2018/0009162 A1* | 1/2018 | Moore  | B33Y 70/00 |
| 2018/0264724 A1* | 9/2018 | Feller | B29C 64/393 |
| 2019/0160733 A1* | 5/2019 | Mirkin | B29C 64/264 |
| 2019/0291343 A1* | 9/2019 | Feller | B29C 64/264 |
| 2021/0094231 A1* | 4/2021 | Feller | B29C 64/245 |
| 2022/0161492 A1* | 5/2022 | Elsey  | B33Y 30/00 |

OTHER PUBLICATIONS

Walker et al., Rapid, large-volume, thermally controlled 3D printing using a mobile liquid interface, Science, Oct. 18, 2019, pp. 360-364, the American Association for the Advancement of Science, Washington, DC, USA.

\* cited by examiner

3-D PRINTER

BACKGROUND

Field of the Invention

The present invention generally relates to three dimension printers (3-D printers). More specifically, the present invention relates to 3-D printer that includes a printing tank configured to employ two different liquid mobile layers that are located below a photopolymer that is cured to form an object during the printing process.

Background Information

Three dimension printings (3-D printers) have been used to form a wide variety of products. Objects are printed layer by layer by the 3-D printer by curing portions of a photopolymer layer by layer, one layer at a time, within a tank filled with the photopolymer. A curing device, such as an ultraviolet light source, is projected through a transparent substrate or bottom wall of the tank in order to cure each layer of the object on a carrier surface that is at least partially submerged within the photopolymer. The carrier surface is incrementally raised upward as each layer is cured thereon. One problem with this arrangement, is that portions of the photopolymer can adhere to the transparent substrate (bottom wall of the tank). This adhesion slows and/or delays the printing process, thereby decreasing productivity. It is therefore advantageous to prevent adhesion of the photopolymer to the transparent substrate.

SUMMARY

One object of the present disclosure is to provide the tank of a 3-D printer apparatus with at least a first mobile layer defined by an oxygen filled liquid that separates the photopolymer from an upper surface of a bottom wall of the tank.

Another object of the present disclosure is to maintain a continuous flow of the liquid of the first mobile layer along the upper surface of the bottom wall in order to further limit and/or prevent adhesion of the photopolymer to the bottom wall and to draw heat out of the tank.

Still another object of the present disclosure is to provide a second mobile layer defined by an inhibition liquid that overlays the first mobile layer, the second mobile layer being located beneath a printing area within the 3-D printer.

In view of the state of the known technology, one aspect of the present disclosure is to provide a method of operating a 3-D printer apparatus. The method includes providing a tank structure with a bottom wall, the tank structure defining a printing area above and spaced apart from the bottom wall. A gas permeable liquid is provided within the tank above and along the bottom wall of the tank structure defining a first mobile layer below the printing area. An inhibition liquid is provided within the tank along and above the gas permeable liquid defining a second mobile layer below the printing area. A polymerizable resin is provided within the tank above the inhibition liquid within the printing area. A position of a lower surface of an object carrier is controlled, the lower surface initially being located within the polymerizable resin within the printing area. Further, operation of a resin curing device is controlled to provide light to the printing area thereby polymerizing predetermined portions of the polymerizable resin forming an object attached to the lower surface of the object carrier.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
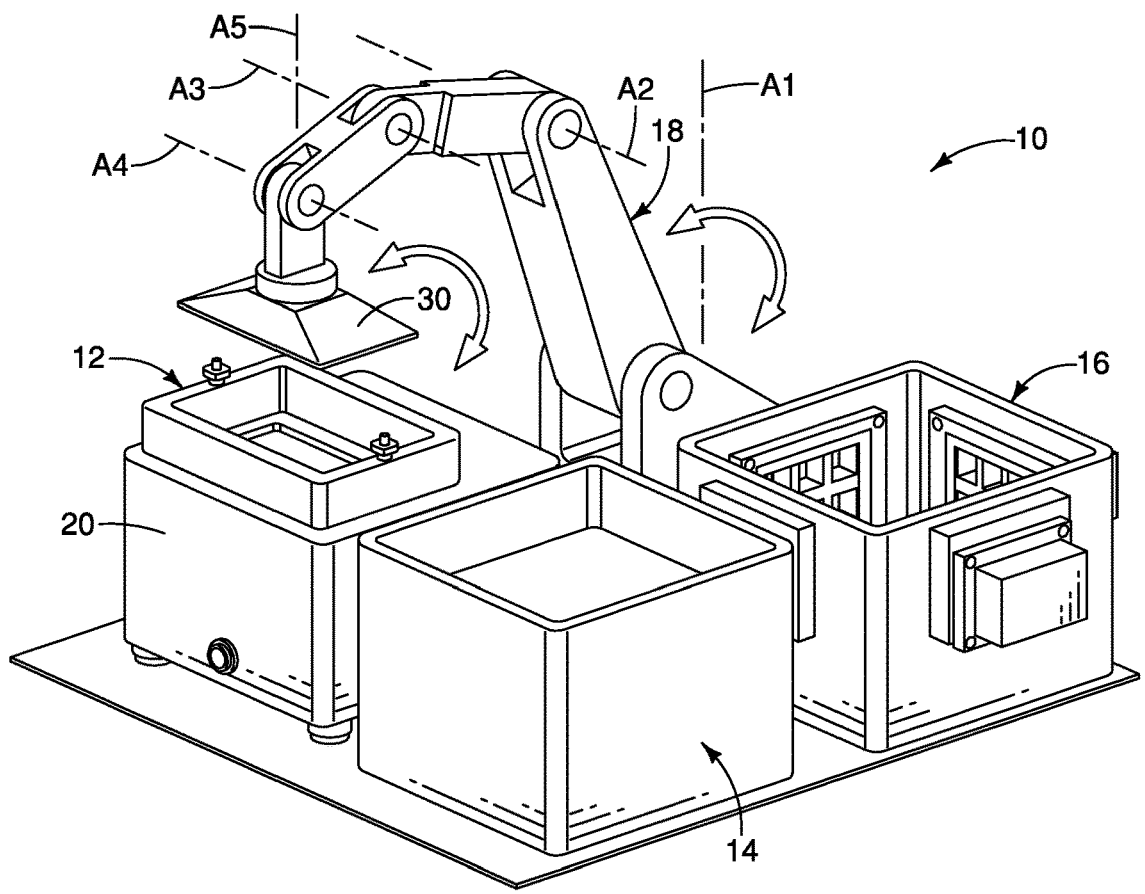
FIG. 1 is a perspective view of a 3-D printer apparatus that includes a printer assembly, a rinse station, a final curing station and a robotic arm in accordance with a first embodiment.

Referring initially to FIG. 1, a three-dimensional printer apparatus 10 (hereinafter the 3-D printer apparatus 10) is illustrated in accordance with a first embodiment. The 3-D printer apparatus 10 includes a printer assembly 12, a rinse station 14, a final curing station 16 and a robotic arm 18.

As shown in FIG. 1, the 3-D printer apparatus 10 is shown with the printer assembly 12, the rinse station 14, the final curing station 16 and the robotic arm 18 are shown as an assembled group of devices. Alternatively, the 3-D printer apparatus 10 can be separate stations that are individual units where the robotic arm 18, or a series of robotic arms are operated together in order to access and utilize the features of each of separated versions of the printer assembly 12, the rinse station 14 and the final curing station 16.

Figure 2:
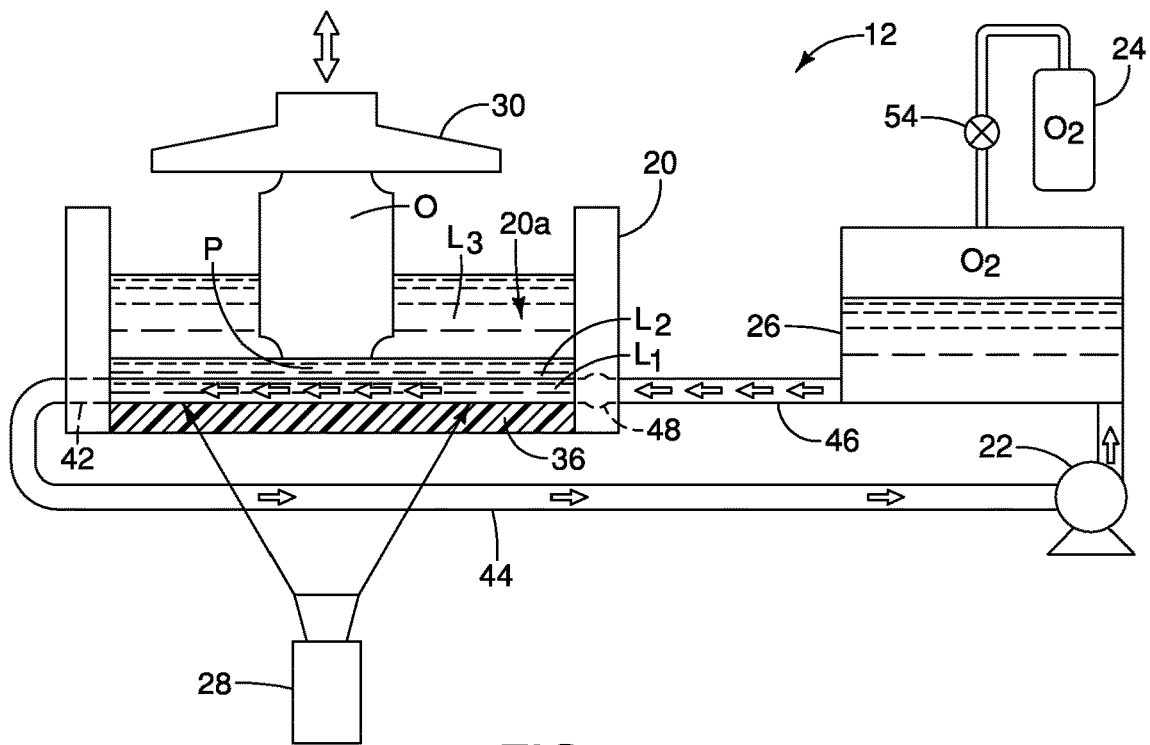
FIG. 2 is a schematic side view of the printer assembly showing an object carrier attached to the robotic arm and a tank of the printer assembly that includes a gas permeable liquid layer (a first mobile layer) that flows over a bottom wall of the tank, a fluid movement device (pump) and an oxygen providing device that cause the gas permeable liquid layer to undergo laminar flow through the tank, an inhibition liquid layer (a second mobile layer) overlaying the gas permeable liquid layer, a polymerizable resin (a photopolymer) overlaying the inhibition liquid layer, an resin curing device below the bottom wall, and an object printed layer by layer onto a bottom surface of the object carrier in accordance with the first embodiment.
Figure 3:
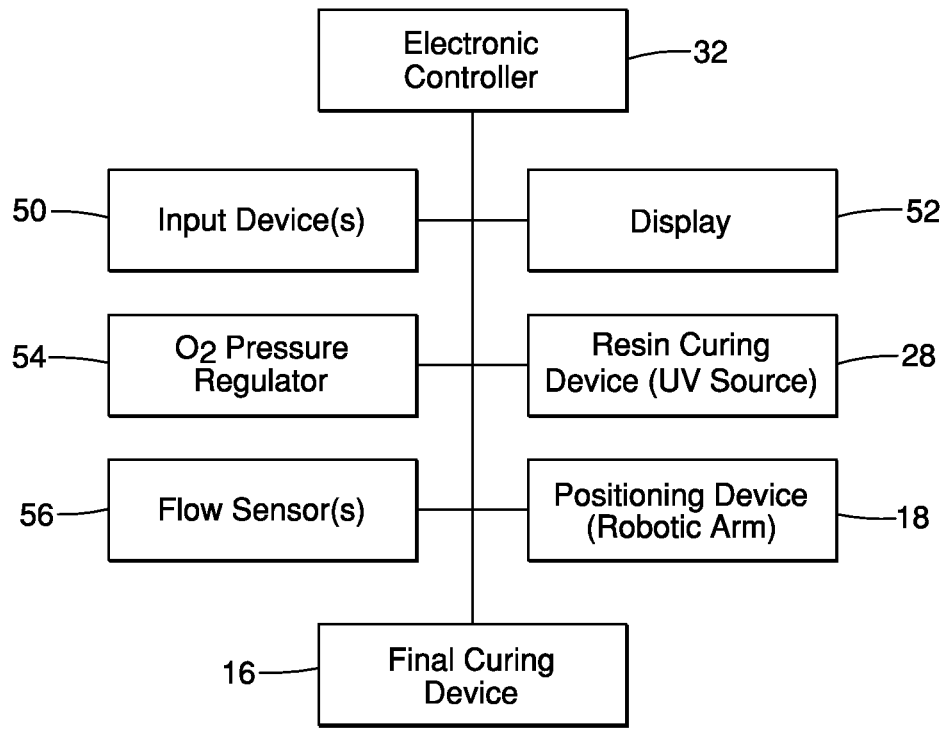
FIG. 3 is a block diagram showing an electronic controller that is electronically connected to and controlling operation of, among other features, the robotic arm, a pressure regulator of the oxygen providing device (and part of the fluid movement device) and the resin curing device in accordance with the first embodiment.

As shown in FIGS. 2 and 3, the 3-D printer apparatus 10 can alternatively consist of the printer assembly 12 and the robotic arm 18.

As shown schematically in FIG. 2, the printer assembly 12 includes a tank 20, at least one fluid movement device 22, an oxygen providing device 24, a reservoir 26, a resin curing device 28 and an object carrier 30 connected to the robotic arm 18. The printer assembly 12 also includes an electronic controller 32, as shown in FIG. 3. A more detailed description of each of these portions of the printer assembly 12 is provided after a brief overview of the basic functions of these features.

As shown in FIG. 2, during operation of the printer assembly 12, the tank 20 is at least partially filled with three differing liquid layers. First, there is a bottom layer $L_1$ that is a gas permeable liquid within the tank 20 that is located along and covers a bottom wall 36 of the tank 20. The bottom layer $L_1$ is also referred to herein below as the gas permeable liquid $L_1$. During the printing operations of the printer assembly 12, the gas permeable liquid $L_1$ defines what is referred to hereinafter as a first mobile layer below a printing area P within the tank 20, as is described in greater detail below.

A mid layer $L_2$ is an inhibition liquid located within the tank 20 immediately above and covering the gas permeable liquid $L_1$ (the first mobile layer). During the printing operations of the printer assembly 12, the mid layer $L_2$ (referred to hereinbelow as the inhibition liquid $L_2$) defines a second mobile layer below the printing area P and above the first mobile layer (the gas permeable liquid $L_1$), as is described in greater detail below.

A top layer $L_3$ is a polymerizable resin above and covering the inhibition liquid $L_2$. The top layer $L_3$ is also referred to herein below as the polymerizable resin $L_3$. The polymerizable resin $L_3$ is located within the tank 20 such that a portion of the polymerizable resin $L_3$ flows freely into the printing area P during the operation of the printing assembly 12, as is described in greater detail below. As is shown in FIG. 3, the polymerizable resin $L_3$ can be supplied to the tank 20 such that the polymerizable resin $L_3$ fills most or all of an interior volume 20a of the tank 20, depending upon the object O being printed and the anticipated volume of use of polymerizable resin $L_3$ needed to print the object being printed by the printer assembly 12.

One of the purposes of the gas permeable liquid $L_1$ (the first mobile layer) is to separate and space apart the polymerizable resin L from the bottom of the tank 20, as described in greater detail below. Similarly, the inhibition liquid $L_2$ (the second mobile layer) further separates the polymerizable resin $L_3$ from the bottom of the tank 20 and also separates the gas permeable liquid $L_1$ (the first mobile layer) from print area P, as described further below.

The printing area P is defined as being the space below the object carrier 30 (and below a lower surface of the object O being printed) and the upper surface of the inhibition liquid $L_2$. Further, the printing area P is located above and spaced apart from the bottom wall 36 of the tank 20 and the gas permeable liquid $L_1$ (the first mobile layer).

As shown schematically in FIG. 2, the at least one fluid movement device 22 (for example, a mechanical pump or other fluid movement device) draws fluid from the bottom of the tank 20 such that only the gas permeable liquid $L_1$ is drawn from the tank 20. The gas permeable liquid $L_1$ is drawn through a first manifold 42 (described in greater detail below) through a fluid passageway 44 (or conduit) and into the reservoir 26. From the reservoir 26, the fluid (the gas permeable liquid $L_1$) is then fed through a further fluid passageway 46 (or conduit) to a second manifold 48. The gas permeable liquid $L_1$ passes through the second manifold 48 and into the tank 20.

The first manifold 42, the at least one fluid movement device 22, the fluid passageway 44, the fluid passageway 46 and the second manifold 48 are all dimensioned, operated and shaped to ensure a laminar flow of the gas permeable liquid $L_1$ as it flows into, through and out of the tank 20. Maintaining laminar flow of the gas permeable liquid $L_1$ ensures that little or no mixing of the inhibition liquid $L_2$ and the gas permeable liquid $L_1$ occurs.

In FIG. 2, the oxygen providing device 24 is a pressurized tank (or other source of compressed $O_2$) that feeds oxygen ($O_2$) into the reservoir 26, and hence into the gas permeable liquid $L_1$. It should be understood that FIG. 2 is a schematic view showing, among other features, laminar flow of the gas permeable liquid $L_1$ (the first mobile layer) through the tank 20 during operation of the printing apparatus 12. FIG. 2 is not meant to restrict the printer assembly 12 with respect to the specific design of the tank 20 and relative location of the fluid movement device 22 and/or the oxygen providing device 24. For example, the oxygen providing device 24 can feed oxygen ($O_2$) to the gas permeable liquid $L_1$ at any of a variety of locations, such as within the tank 20 itself, or upstream of the fluid movement device 22. In other words, oxygen ($O_2$) can be provided to the gas permeable liquid $L_1$ at a location or locations other than to the reservoir 26.

A further description of the printing process and the oxygen providing process is described further below.

As shown in FIG. 3, the printer assembly 12 includes the electronic controller 32, an input device 50, display 52, oxygen pressure regulator 54, flow sensors 56 and reservoir 26, the resin curing device 28, the final curing device 16 and the robotic arm 18 (also referred to as the positioning device 18).

The input device 50 can be any combination of, or all of: a mouse, keyboard, USB port, wireless communication device (i.e., WiFi), Ethernet connection, etc. Further, the display 52 can be a touch screen display or non-touch screen display. The oxygen pressure regulator 54 is connected to a feed line or pipe that receives oxygen from the oxygen providing device 24. The oxygen providing device 24 is preferably compressed oxygen ($O_2$) but can, alternatively, be ambient compressed air. The flow sensor or sensors 56 can be installed at any of a variety of locations within the tank 20 or conduits such that they measure the rate of flow of the gas permeable liquid $L_1$. The flow sensors 56 can additionally be level sensors that configured to monitor levels of each of the three layers of liquid in the tank 20 and reservoir 26. The resin curing device 28 is installed or located below the tank 20 and is positioned to selectively project light upward through transparent bottom wall 36 of the tank structure 20. The electronic controller 32 controls operation of the resin curing device 28 to cure and harden the polymerizable resin $L_3$ (layer $L_3$) located within the printing area P in order to form the object O. The resin curing device 28 can be any of a variety of resin curing light sources such as an ultra-violet projector, laser (stereolithography) digital light projector, liquid crystal display, projector or other light emitting device capable of electronic focusing and imaging focused light in order to selectively cure polymerizable resin to form the object O.

The electronic controller 32 preferably includes a microcomputer with printer and robotic arm control programs that control the printer assembly 12 and the robotic arm 18, as discussed below. The electronic controller 32 can also include other conventional components such as an input interface circuit, an output interface circuit, and storage devices such as a ROM (Read Only Memory) device and a RAM (Random Access Memory) device. The microcomputer of the electronic controller 32 is programmed to control the printer assembly 12 and the robotic arm 18. The memory circuit stores processing results and control programs such as ones for printer and robotic arm operation that are run by the processor circuit. The electronic controller 32 is operatively and/or electronically coupled to the input device(s) 50, the display 52, the oxygen pressure regulator 56, the flow sensors 56, the resin curing device 28, the final curing device 16 and the robotic arm 18 in a conventional manner. The internal RAM of the electronic controller 32 stores statuses of operational flags and various control data. The internal ROM of the electronic controller 32 stores the codes and instructions for various operations. It will be apparent to those skilled in the art from this disclosure that the precise structure and algorithms for the electronic controller 32 can be any combination of hardware and software that will carry out the functions of the present invention.

Figure 4:
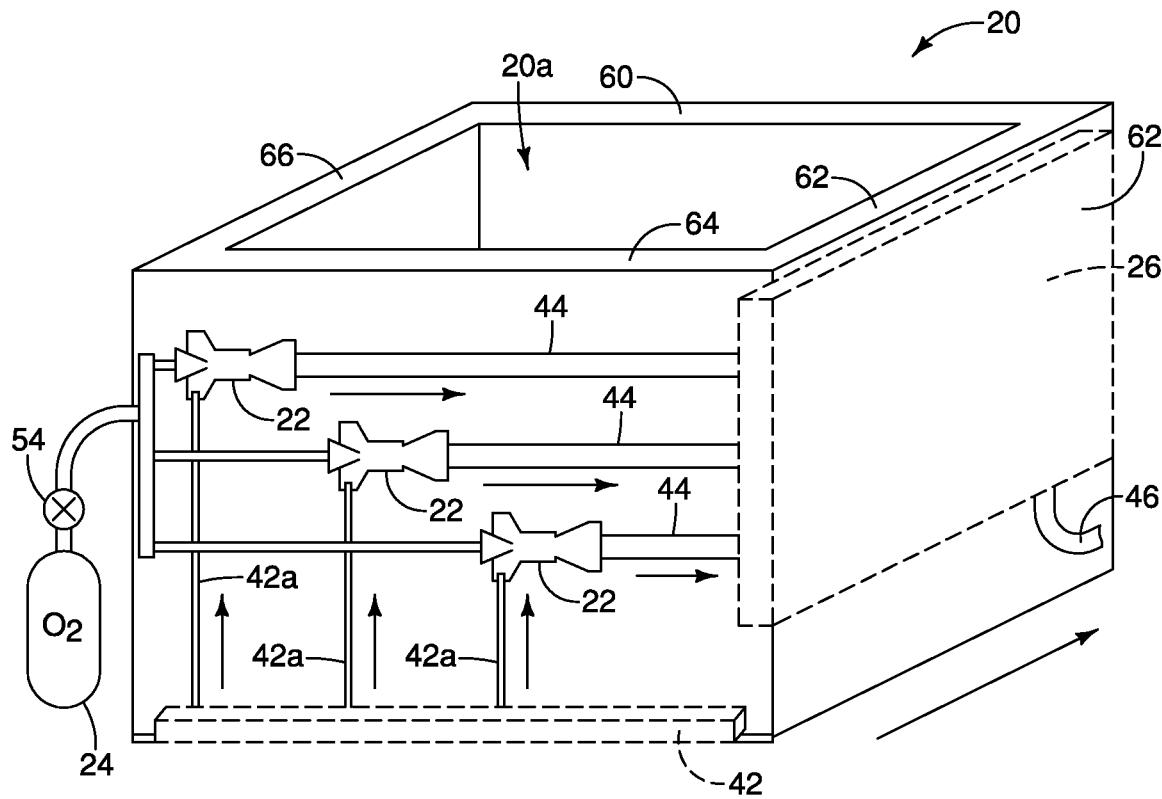
FIG. 4 is a side perspective view of the tank showing first, second, third and fourth side walls thereof, the second side wall including a reservoir that retains a supply of the gas permeable liquid layer, and the third side wall having a first manifold and a plurality of the fluid movement devices in accordance with the first embodiment.
Figure 5:
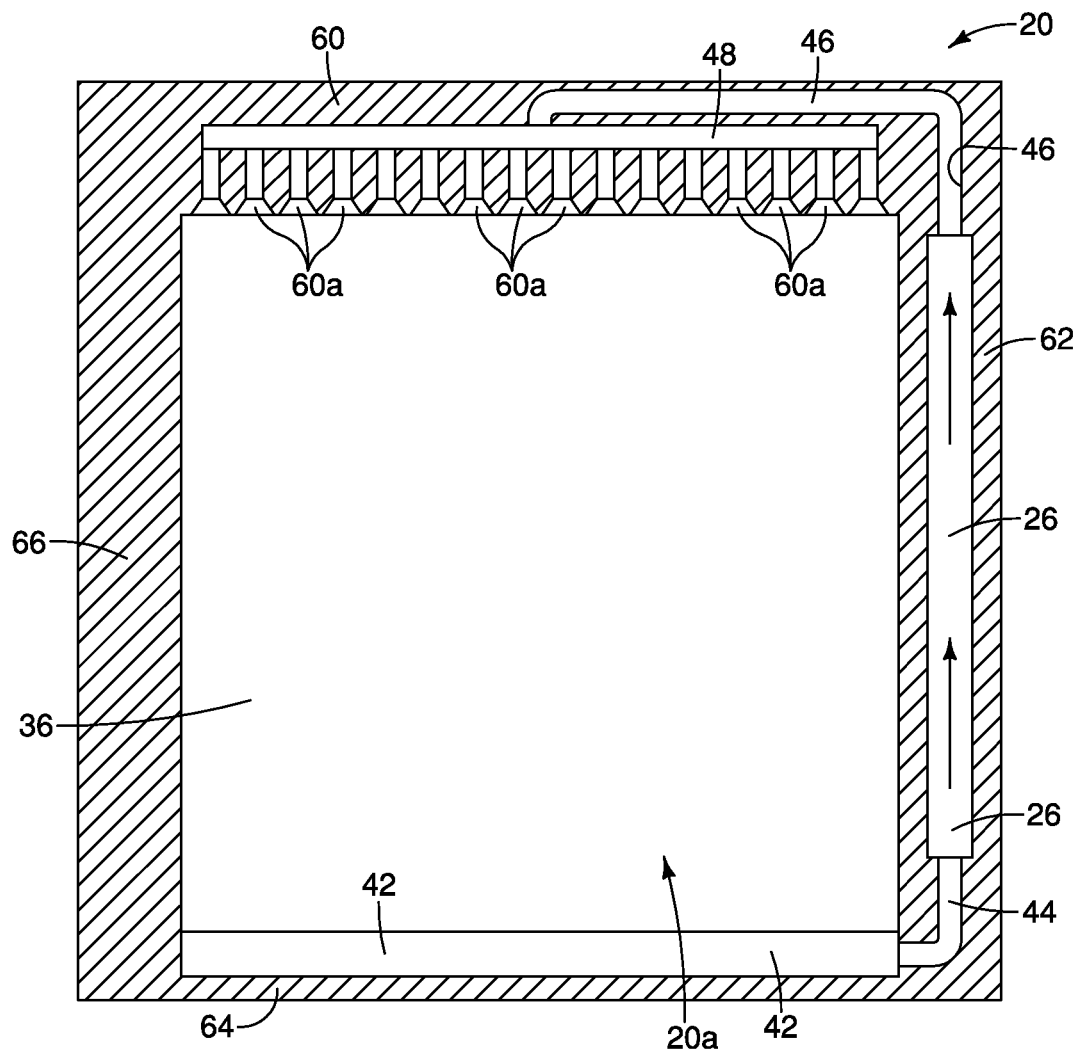
FIG. 5 is a top cross-sectional view of the tank (looking down) showing a second manifold within the first side wall configured to produce laminar flow of the gas permeable liquid layer, the reservoir located within the second side wall and the first manifold within the third side wall in accordance with the first embodiment.

A description of one embodiment of the tank 20 is now provided with specific reference to FIGS. 4 and 5. The tank 20 includes a first side wall 60, a second side wall 62, a third side wall 64, a fourth side wall and the bottom wall 36. The first side wall 60, the second side wall 62, the third side wall 64 and the fourth side wall 66 can be made as a single element or as separate elements assembled together to form the tank 20.

The bottom wall 36 is attached to bottom ends or bottom edge sections of each the first side wall 60, the second side wall 62, the third side wall 64 and the fourth side wall 66 to form a liquid tight space within the tank 20. The first side wall 60, the second side wall 62, the third side wall 64 and the fourth side wall 66 can be manufactured of any of a variety of materials, including plastic materials, polymer materials and/or metallic materials. The bottom wall 36 is made of any of a variety of transparent materials, such as plexiglass, traditional glass or any suitable transparent plastic or polymer material. Specifically, the bottom wall 36 is made of a transparent material such that focused beams of light from the resin curing device 28 passes therethrough and at predetermined areas or portions of the polymerizable resin $L_3$ located within the printing area P.

As shown in FIG. 5, the first side wall 60 includes the second manifold 48 (a manifold area). The second manifold 48 can include a plurality of ports 60a open to a bottom area of the interior of the tank 20 corresponding to the location of the gas permeable liquid $L_1$ (the first mobile layer). As shown in FIG. 5, each of the plurality of ports 60a include a diverging end that is open to the interior volume 20a. The second manifold 48 is located and dimensioned to provide laminar flow of the gas permeable liquid $L_1$ along the bottom wall 36 of the tank structure 20 toward the third side wall 64.

The second side wall 62 is configured to include the reservoir 26. The reservoir 26 retains a supply of the gas permeable liquid $L_1$ during the printing operations of the printer assembly 12. As is further described below, the reservoir 26 is in fluid communication with the second manifold 48 (second manifold area) of the first side wall 60 via the fluid passageway 46, as shown in FIG. 5.

The third side wall 64 is configured to include the first manifold 42 (the outlet manifold of the tank 20). The first manifold 42 can include an elongated slot open to the interior of the tank 20 dimensioned such that the gas permeable liquid $L_1$ flows from the tank 20 maintaining laminar flow of the gas permeable liquid $L_1$.

As shown in FIG. 4, the third side wall 64 can also include a plurality of the fluid movement devices 22. In the depicted embodiment, the third side wall 64 includes three fluid movement devices 22. Operation of the fluid movement devices 22 is now described with reference to FIGS. 4 and 6.

Figure 6:
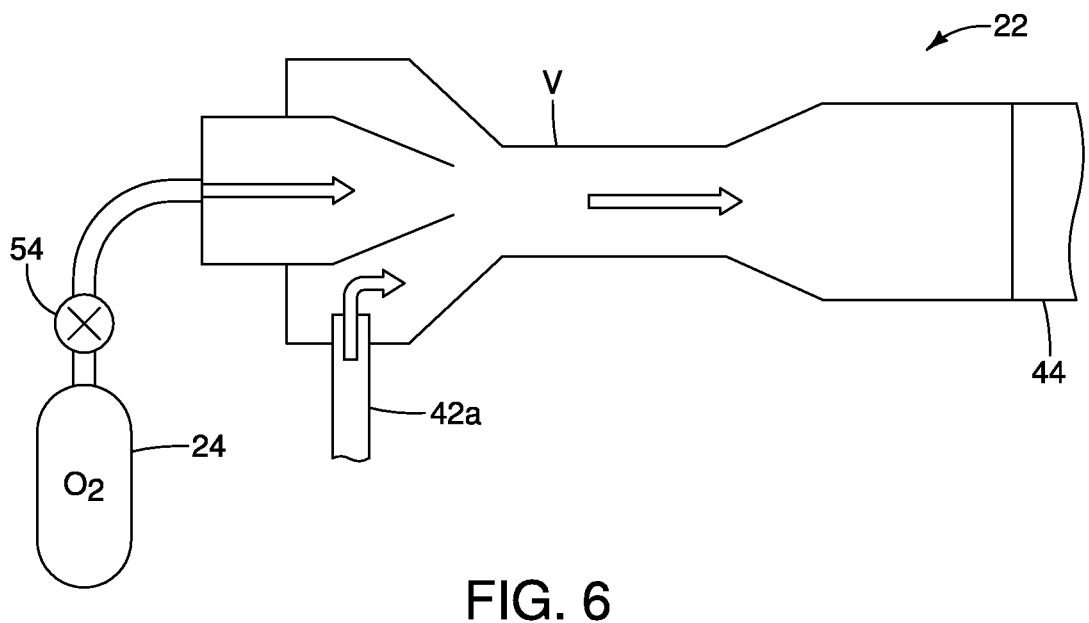
FIG. 6 is a side schematic view of one of the fluid movement devices in the third side wall showing basic operation thereof in accordance with the first embodiment.

As shown schematically in FIG. 6, the fluid movement device 22 includes a venturi tube V, sometimes referred to as an ejector pump. The first manifold 42 is in fluid communication with the upstream end of the venturi tube V via a fluid passageway 42a. Compressed oxygen $O_2$ is released to the upstream end of the venturi tube V from the oxygen providing device 24. The rate of flow of the oxygen $O_2$ from the oxygen providing device 24 is controlled by the electronic controller 32 via operation of the oxygen pressure regulator 54. The flow of the oxygen $O_2$ draws the gas permeable liquid $L_1$ from the tank 20 via the fluid passageway 42a into the upstream end of the venturi tube V (the left side of the venturi tube V). The flow of oxygen $O_2$ further moves the gas permeable liquid $L_1$ through the venturi tube V and into the fluid passage 44. Function and effects of a venturi tube and ejector pumps are well known, therefore further description of the venturi tube is omitted for the sake of brevity.

From the venturi tube V, the oxygen $O_2$ and the gas permeable liquid $L_1$ are mixed together and are urged through the fluid passage 44 and into the reservoir 26. From the reservoir 26, the oxygen $O_2$ and the gas permeable liquid $L_1$ are further urged through the fluid passageway 46, into the second manifold 48 and back into the tank 20. The controlled flow of oxygen $O_2$ by the electronic controller 32 is such that laminar flow is established and maintained along the bottom wall 36 of the tank 20. The electronic controller 32 adjusts the level and pressure of the oxygen $O_2$ in order to maintain and ensure laminar flow of the gas permeable liquid $L_1$.

Referring again to FIG. 1, the object carrier 30 is attached to a distal end of the robotic arm 18 such that when the electronic controller 32 operates the robotic arm 18 to precisely position the object carrier 30. More specifically, the robotic arm 18 is configured to move the object carrier 30 vertically up and down within the tank 20 in small increments, such as several thousands of an inch. The robotic arm 18 is further configured to move the object carrier 30 and the object O printed thereon from the tank 20 of the printer assembly 12 to the rinse station 14 and further to the final curing station 16.

The robotic arm 18 is configured for movement about a vertical axis $A_1$, horizontal axes $A_2$, $A_3$ and $A_4$, as well as vertical axis $A_5$. Consequently, the object carrier 30 can be positioned by movement of the robotic arm 18 about five differing axes. It should be understood form the drawings and the description herein that the robotic arm 18 is configured for multiple degrees of freedom of movement for precise movement and positioning of the object carrier 30 and the object O produced by the 3-D printer apparatus 10. Since robotic arms are conventional electro-mechanical devices, further description is omitted for the sake of brevity.

Operation of the printer assembly 12 via control by the electronic controller 32 is now described in greater detail below with specific reference to FIGS. 7-14.

Figure 7:
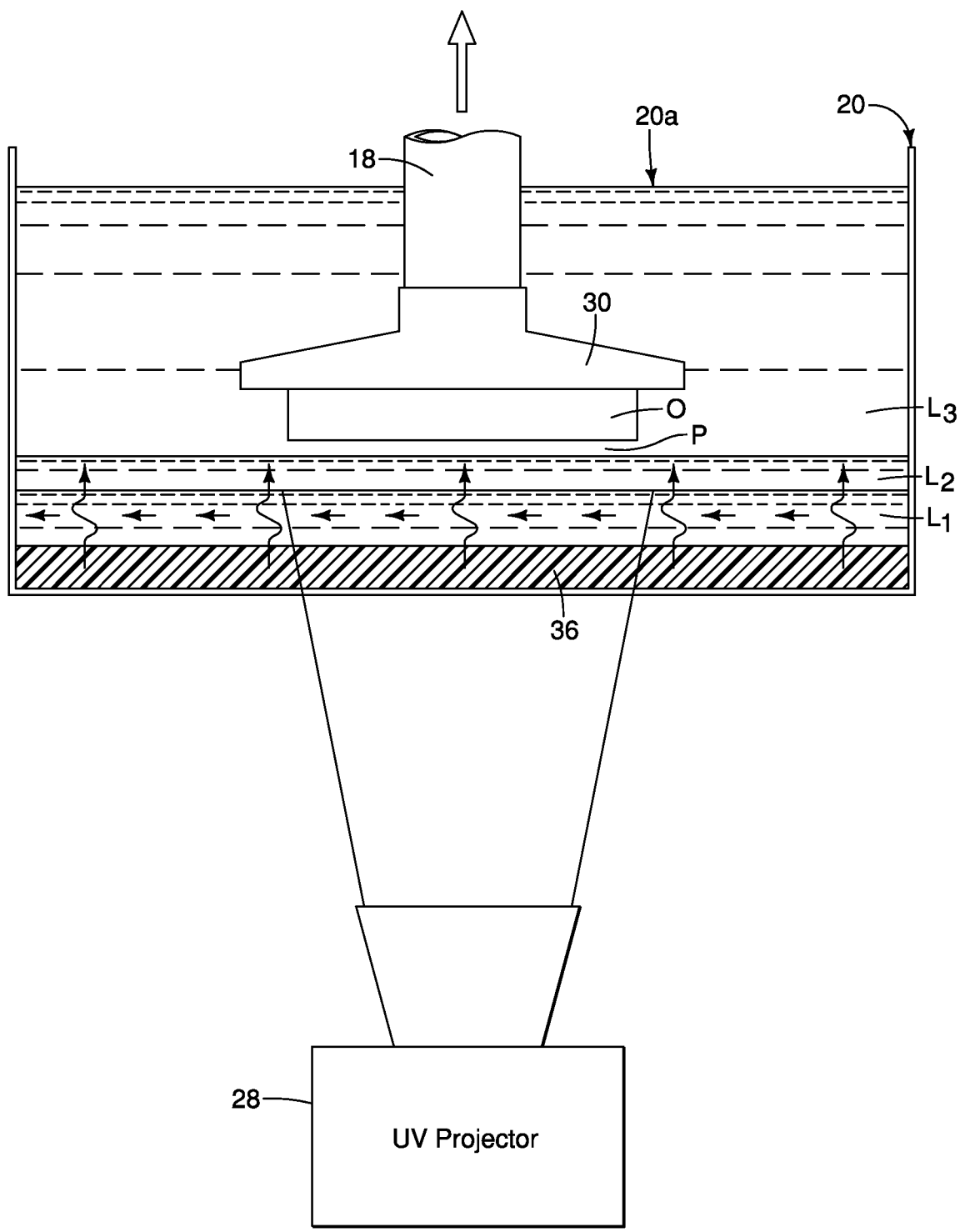
FIG. 7 is a side schematic view of the printer assembly 12 showing the tank, the object carrier attached to an end of the robotic arm, an object partially formed on the object carrier, the resin curing device, the oxygen permeable liquid, the inhibition liquid and the polymerizable resin within the tank in accordance with the first embodiment.

As shown in FIG. 7, the object carrier 30 is initially positioned within the tank 20 and can be completely submerged within the polymerizable resin $L_3$. Initially, the polymerizable resin $L_3$ is in a liquid state. The object O to be produced by the 3-D printer apparatus 10 is formed on an underside or bottom surface of the object carrier 30, as described below.

Figure 8:
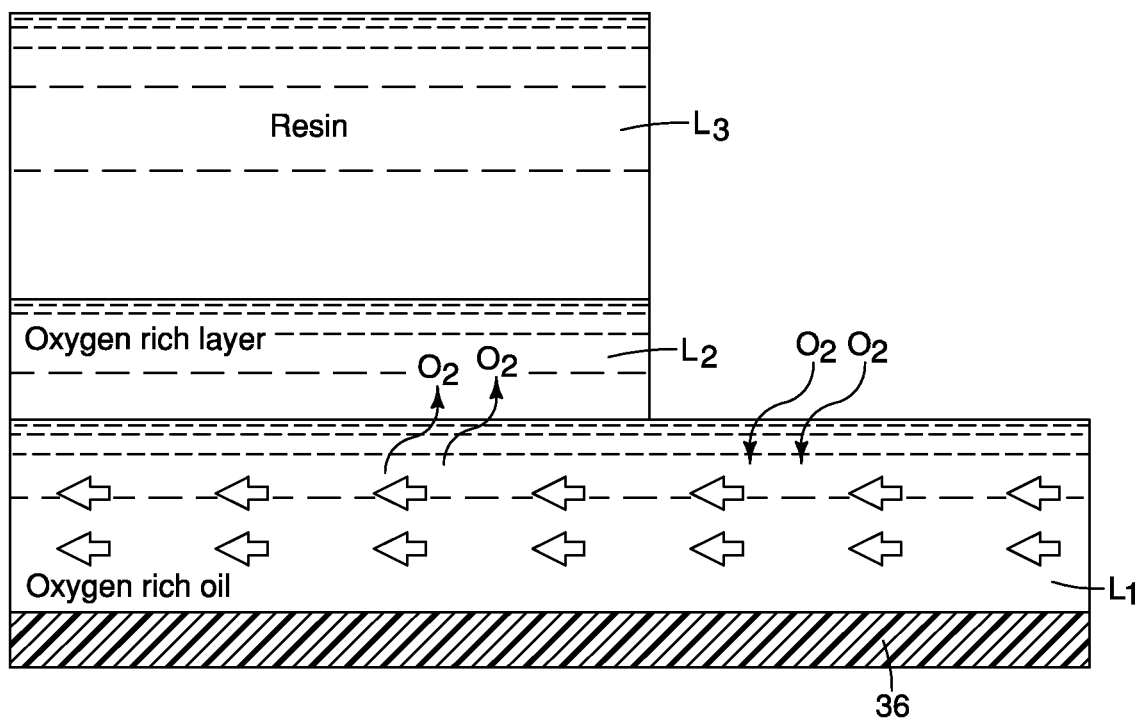
FIG. 8 is another side schematic of a portion of the tank showing the bottom wall, the oxygen permeable liquid covering the upper surface of the bottom wall, the inhibition liquid floating above the oxygen permeable liquid and the polymerizable resin covering the inhibition liquid within the tank in accordance with the first embodiment.

As shown in FIGS. 7 and 8, initially laminar flow of the gas permeable liquid $L_1$ is established along the bottom wall 36 of the tank 20. Due to the operation of the oxygen providing device 24 and the fluid movement devices 22 (the ejector pumps) oxygen $O_2$ is forced into and absorbed into the gas permeable liquid $L_1$.

The gas permeable liquid $L_1$ (defining the first mobile layer) can include one or more of the following group of materials: silicone containing polymers include polydimethylsiloxane (PDMS), cross-linked poly(dimethylsiloxane), poly((trimethylsilyl)propyne) and cross-linked poly(dimethylsiloxane) core and a polydimethylsiloxane and a poly(sils esquioxane) (PDMS/POSS), nafion (sulfonated tetraflouroethylene); co-polymers such as: poly(dimethylsiloxane)-polyamide multiblock copolymer; copolymerizations of diphenylacetylenes having various silyl groups [PhC^CC6H4-R], R ¼ p-SiMe3 (TMSDPA), p-SiEt3 (TESDPA), p-SiMe2-n-C8H17 (DMOSDPA), and p-SiPh3 (TPSDPA) diphenylacetylene having a tert-butyl group (PhC^CC6H4-tertBu; TBDPA poly(TPSDPA-co-TBDPA, poly(TMSDPA-co-TBDPA), polyl[1-(p-trimethylsilyl)phenyl-2-(p-trimethylsilyl)phenylacetylene]; Teflon™ AF 2400, Teflon™ AF 1600, Teflon™ (also known as amorphous fluoroplastic resins having polytetrafluoroethylene). Dimethylsilicone rubber, Dimethylsilicone oil, Fluorosilicone, Fluorosilicone oil, Nitrile rubber and PTFE (polytetrafluoroethylene).

Alternatively, the gas permeable liquid $L_1$ (defining the first mobile layer) can include one or more of the following group of materials: silicon oil with addition of solid oxygen permeable particles, silicon oil with addition of silicone containing polymers that enhance oxygen permeability such as at least one inorganic material, metalloids, boron nitrides, metal oxides (including iron oxide, aluminum oxide, titanium dioxide, Zirconium oxide and metal sulfides, such as ZnS and CdS, 100-200 nm in size and 1-10% weight percentage of inorganic materials in the matrix.

The laminar flow of the gas permeable liquid $L_1$ is provided, in part, as a coolant that draws heat from within the tank 20 during the printing process and releases some of that heat via the exterior surface of the second side wall 62 and the reservoir 26 to ambient air. However, more importantly, the laminar flow of the gas permeable liquid $L_1$ along the bottom wall 36 ensures that the gas permeable liquid $L_1$ maintains a separation between the printing area P within the tank 20 and the transparent bottom wall 36.

In the tank 20, above the gas permeable liquid $L_1$, the inhibition liquid $L_2$ is provided, defining the second mobile layer. Due to the laminar flow of the gas permeable liquid $L_1$, the inhibition liquid $L_2$ lays relatively undisturbed over the gas permeable liquid $L_1$. The inhibition liquid $L_2$ initially can have little if any oxygen $O_2$ in it, but gradually absorbs some oxygen $O_2$ from the gas permeable liquid $L_1$. The gas permeable liquid $L_1$ is provided with oxygen $O_2$ in large part so that the inhibition liquid $L_2$ receives sufficient amounts of oxygen $O_2$ so that the inhibition liquid $L_2$ does not get cured and hardened by operation of the resin curing device 28. More specifically, the inhibition liquid $L_2$ has an oxygen $O_2$ content that prevents curing and hardening thereof when the resin curing device 28 is operated. Oxygen $O_2$ inhibits curing of photopolymers when provided to the photopolymers in sufficient amounts.

The inhibition liquid $L_2$ can be any of a variety of oxygen inhibiting liquids. However in the depicted embodiment, the inhibition liquid $L_2$ (the second mobile layer) is initially the same resin material as the polymerizable resin $L_3$. However, once infused with oxygen $O_2$, the volume of polymerizable resin $L_3$ that defines the inhibition liquid $L_2$ (the second mobile layer) no longer cures or is extremely unlikely to cure in response to the operation of the resin curing device 28 due to the presence of oxygen $O_2$. Specifically, polymerizable resins (photopolymers) lose their ability to be polymerized by a resin curing device such as the resin curing device 28 when infused with oxygen $O_2$. The inhibition liquid $L_2$ will therefore not be cured or hardened during operation of the printer assembly 12 by the resin curing device 28 thereby making it a second mobile layer that does not harden or become part of the printed object O. The inhibition liquid $L_2$ is also referred to herein as an oxygen rich layer, as indicated in FIG. 8. The inhibition liquid $L_2$ is also referred to as an inhibition liquid because the oxygen content inhibits curing thereof.

As mentioned above, the laminar flow of the gas permeable liquid $L_1$ (the first mobile layer) can provide cooling during the printing operation but more importantly separates the bottom wall 36 from the printing area P. Any oxygen $O_2$ leaving the gas permeable liquid $L_1$ makes its way to the inhibition liquid $L_2$. The oxygen $O_2$ content of the gas inhibition liquid $L_2$ eliminates the possibility of the second mobile layer being cured when the resin curing device 28 is operated.

The tank 20 is then provided with the polymerizable resin $L_3$ that covers the inhibition liquid $L_2$ (the second mobile layer). The amount of the polymerizable resin $L_3$ supplied to the tank 20 is estimated as being the amount of resin necessary to print the object O. The polymerizable resin $L_3$ used during the printing process can be a photopolymer. The photopolymer used as the polymerizable resin $L_3$ can be any of a variety of materials. Table 1 below is provided as examples of photopolymers that can be used to print the object O.

TABLE 1

PHOTOPOLYMERS:

| Material | PI wavelength (photoinitiators) |
| --- | --- |
| Nylon | 290-315 |
| Acrylic | 290-315 |
| Styrene Acrylonitrile | 290, 310-330 |
| Polycarbonate | 280-310 |
| Polystyrene | 310-325 |
| Polyethylene | 300-310, 340 |
| Polypropylene | 290-300, 330, 370 |
| ABS | 300-310, 370-385 |
| PVC homopolymer | 320 |
| PVC copolymer | 330, 370 |
| Polyurethane (aromatic) | 350-415 |

Figure 9:
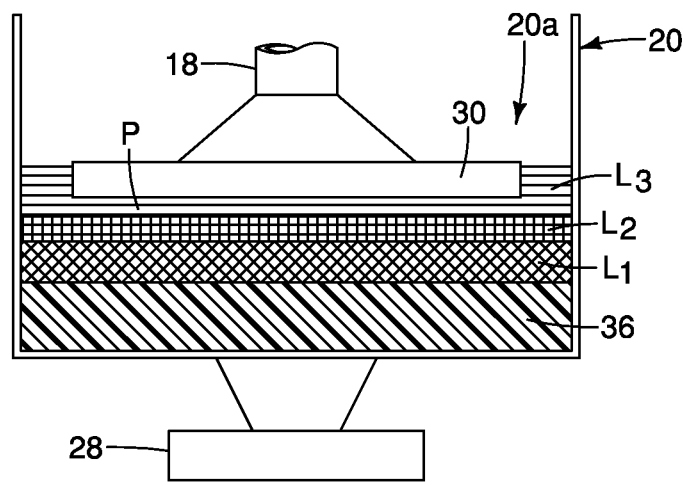
FIG. 9 is a first schematic view of the tank showing the object carrier located at an initial location immediately above a printing area, the printing area being defined by polymerizable resin that has flowed between the bottom surface of the object carrier (or bottom surface of a layer of an object being printed) and the inhibition liquid prior to operation of the resin curing device in accordance with the first embodiment.
Figure 10:
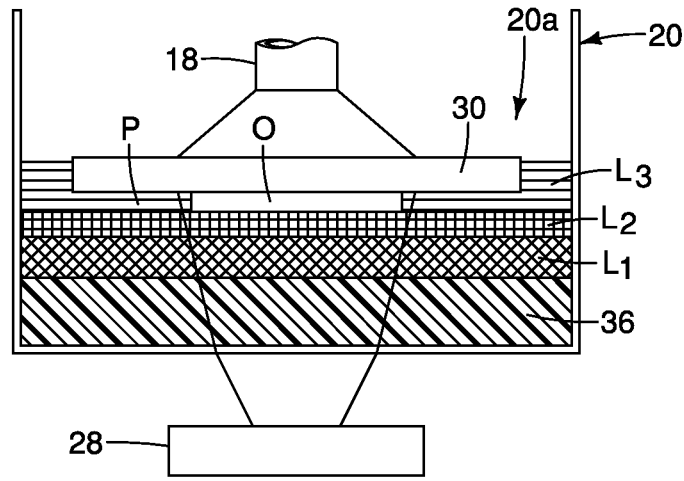
FIG. 10 is a second schematic view of the tank showing the object carrier with a first layer of the object being printed, the first layer being defined by a portion of the polymerizable resin being cured by operation of the resin curing device in accordance with the first embodiment.

Referring now to FIGS. 9-14, the process of 3-D printing is now described in greater detail. The electronic controller 32 operates the robotic arm 18 (a carrier movement device) in order to position a lower surface of the object carrier 30 at, adjacent to or slightly within the printing area P, as shown in FIG. 9. The lower surface of the object carrier 30 defines an object retaining surface. The electronic controller 32 operates the resin curing device 28, emitting, for example, UV light causing predetermined portions of the polymerizable resin $L_3$ to at least partially or fully cure in an initial printing step. During the initial printing step of the printer assembly 12, a first layer of the polymerizable resin $L_3$ within the printing area P is cured or partially cured such that it attaches to the lower surface (the object retaining surface) of the object carrier 30 thereby beginning the printing process, as shown in FIG. 10.

Figure 11:
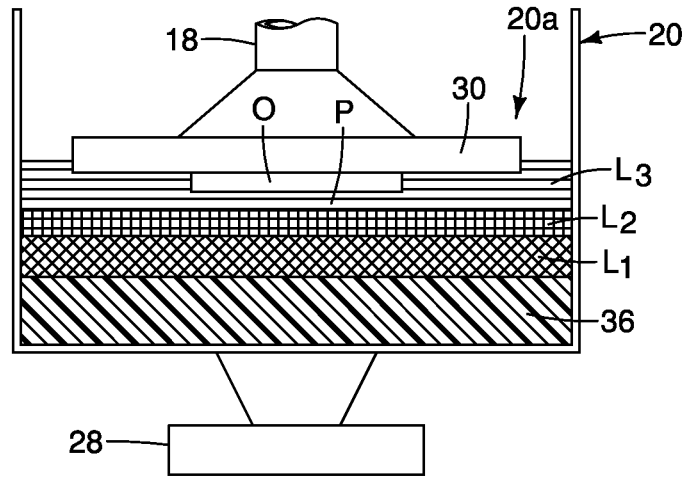
FIG. 11 is a third schematic view of the tank showing the object carrier being repositioned by the robotic arm a predetermined distance above the initial location such that more of the polymerizable resin that has flowed between the surface of the first layer of an object being printed and the inhibition liquid in accordance with the first embodiment.

Next, as shown in FIG. 11, the electronic controller 32 operates the robotic arm 18 thereby raising the object carrier 30 and the initial portion of the object O several thousandths of an inch, as determined by the electronic controller 32 such that the polymerizable resin $L_3$ flows into the printing area P.

Figure 12:
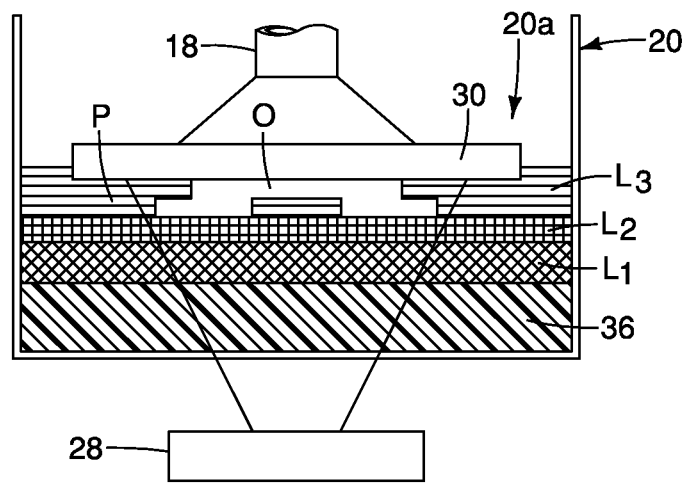
FIG. 12 is a fourth schematic view of the tank showing the object carrier with a second layer of the object being printed on the first layer by operation of the resin curing device in accordance with the first embodiment.

Next, as shown in FIG. 12, the electronic controller 32 operates the resin curing device 28 causing another predetermined portion of the polymerizable resin L to at least partially or fully cure and adhere to the first layer of material forming the object O.

Figure 13:
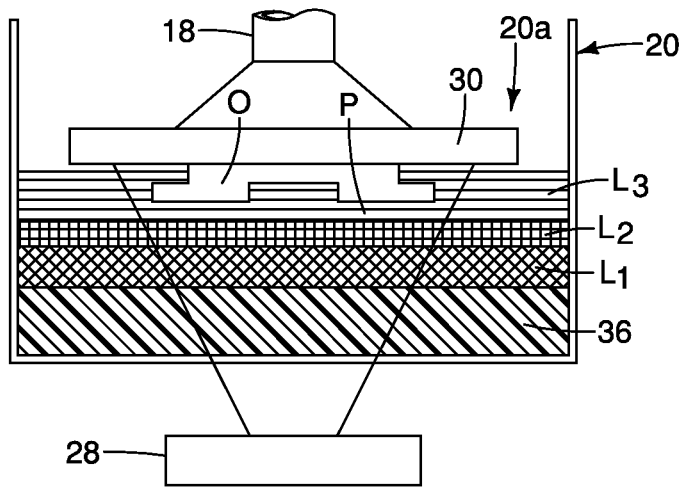
FIG. 13 is a fifth schematic view of the tank showing the object carrier being repositioned by the robotic arm a predetermined distance upward such that more of the polymerizable resin flows between the surface of the second layer of the object being printed and the inhibition liquid in accordance with the first embodiment.

Next, as shown in FIG. 13, the electronic controller 32 operates the robotic arm 18 to again raise the object carrier 30 and the object O a predetermined amount as determined by the electronic controller 32 such that further amounts of the polymerizable resin L flow into the printing area P.

Figure 14:
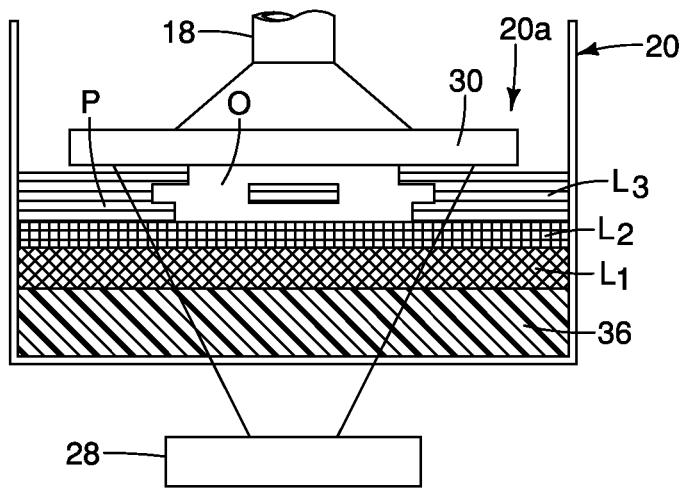
FIG. 14 is a sixth schematic view of the tank showing the object carrier with a third layer of the object being printed on the second layer by operation of the resin curing device in accordance with the first embodiment.

Next, as shown in FIG. 14, the electronic controller 32 operates the resin curing device 28 causing yet another predetermined portion of the polymerizable resin $L_3$ to at least partially or fully cure and adhere to the first layer of material forming the object O.

The above described operations and shown in FIGS. 9 through 14 are repeated until the object O is fully formed.

In the above described steps, the polymerizable resin L can be fully cured during operations of the resin curing device 28, however complete curing is not always necessary, depending upon the size, shape and design of the object O. For example, in a rapid production line, in which many duplicate objects O are being printed, one after another, the printing process can go more quickly, if only partial curing is achieved.

In such a case, after the object O is fully printed, the electronic controller 32 operates the robotic arm 18 to lift the object carrier 30 and the object O out of the tank 20 and into the tank of the rinse station 14 where any uncured and/or any liquid polymerizable resin $L_3$ is washed away. Next, the electronic controller 32 operates the robotic arm 18 to lift the object carrier 30 and the object O out of the tank of the rinse station 14 and into the final curing station 16. The object O is separated from the object carrier 30 and left in the final curing station 16 where the object O is subjected to a further resin curing process via a plurality of light sources within the final curing station 16. The plurality of light sources apply a predetermined amount of appropriate light spectra to completely cure the polymerizable resin $L_3$ thereby completely forming the desired object O.

In general, the first mobile layer (the gas permeable liquid $L_1$) is preferably an oil based solution that has an overall density that is greater than the density of the second mobile layer (the inhibition liquid $L_2$). Further, once oxygen $O_2$ is infused into the inhibition liquid $L_2$, the overall density of the inhibition liquid $L_2$ is greater than the polymerizable resin $L_3$. Hence, the polymerizable resin $L_3$ floats on the inhibition liquid $L_2$, and the inhibition liquid $L_2$ floats on the inhibition liquid $L_2$.

Second Embodiment

Figure 15:
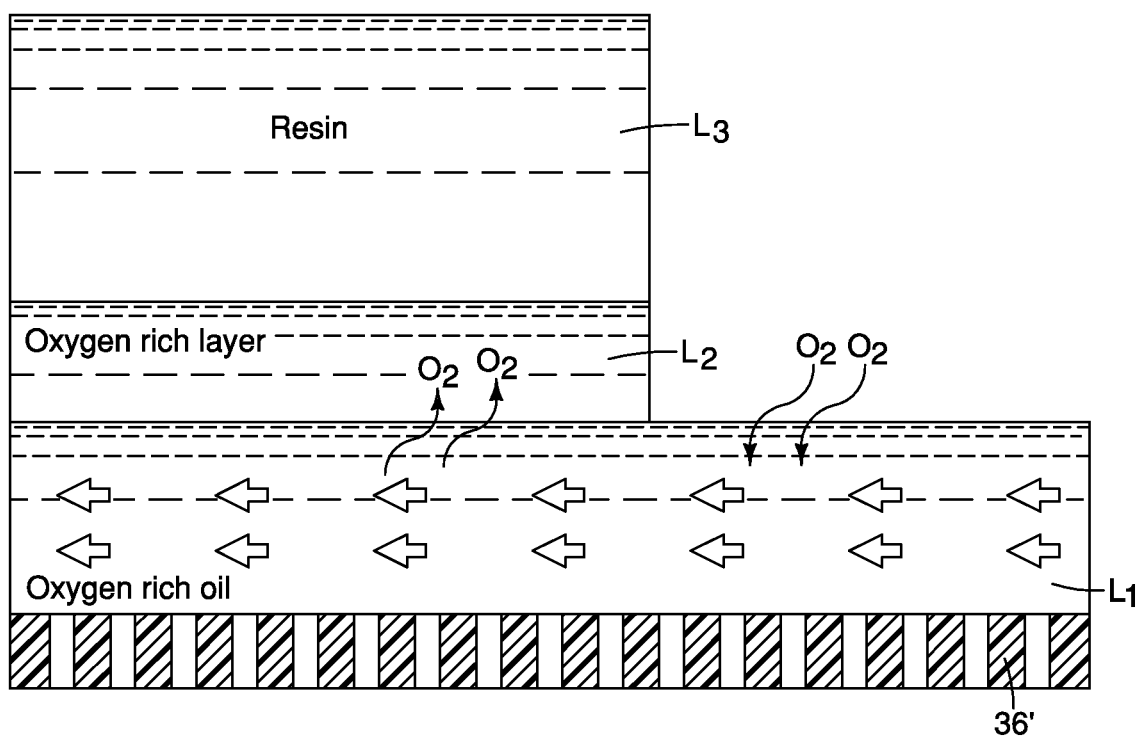
FIG. 15 is a side schematic of a portion of the tank showing the bottom wall that includes a plurality of oxygen passing perforations that supply oxygen to the oxygen permeable liquid, the oxygen permeable liquid covering the upper surface of the bottom wall, the inhibition liquid floating above the oxygen permeable liquid and the polymerizable resin covering the inhibition liquid within the tank in accordance with the first embodiment.

Referring now to FIG. 15, a modification to the tank 20 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the bottom wall 36 of the first embodiment is replaced with a bottom wall 36'. The bottom wall 36' includes a plurality of micro-openings or micro holes that allow forced oxygen $O_2$ to be fed into the gas permeable liquid $L_1$ (the first mobile layer) as is flows through the tank 20, to further increase the amount of oxygen $O_2$ in the gas permeable liquid $L_1$.

In the second embodiment, it is also possible for the micro-holes to provide the only source of oxygen $O_2$ to the gas permeable liquid $L_1$. In the second embodiment, the venturi tubes V (the fluid movement device 22) can optionally be replaced with a mechanical pump.

Some of the features of the 3-D printer apparatus 10 are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion." "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the 3-D printer. Accordingly, these terms, as utilized to describe the present invention should be interpreted relative to a vehicle equipped with the 3-D printer.

The term "detect" as used herein to describe an operation or function carried out by a component, a sensor, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A 3-D printer apparatus, comprising
a tank structure having a bottom wall and a printing area located above and spaced apart from the bottom wall, the tank structure further including a first side wall, a second wall and a third side wall extending upward from the bottom wall that at least partially define an interior volume within the tank structure;
a gas permeable liquid within the tank, above and along the bottom wall of the tank structure defining a first mobile layer below the printing area;
an inhibition liquid within the tank, above, overlaying and contacting the gas permeable liquid defining a second mobile layer below the printing area;
a polymerizable resin above, overlaying and contacting the inhibition liquid and located within the printing area;
an object carrier initially located within the tank during a printing process with the printing area being defined along and below a lower surface of the object carrier;
a carrier movement device attached to the object carrier;
a resin curing device configured to provide light to the printing area;
an electronic controller controlling the printing process and being in electronic communication with the carrier movement device and the resin curing device, the electronic controller being configured to control positioning and movement of the object carrier via operation of the carrier movement device and controlling operation of the resin curing device; and
the first wall having a manifold area that includes a plurality of ports, each of the plurality of ports including a diverging end open to the interior volume of the tank structure, the plurality of ports being located to provide a laminar flow of the gas permeable liquid along the bottom wall of the tank structure toward the third wall, the second wall includes a reservoir, located above the bottom wall, that retains the gas permeable liquid, the reservoir being in fluid communication with the manifold area of the first wall, wherein the gas permeable liquid functions, in part, as a coolant that draws heat from within the tank during the printing process and releases some of the heat via an exterior surface of the second wall and the reservoir to an ambient air.

2. The 3-D printer apparatus according to claim 1, wherein
the gas permeable liquid defining the first mobile layer one or more of the following group of materials: silicone containing polymers include polydimethylsiloxane (PDMS), cross-linked poly(dimethylsiloxane), poly((trimethylsilyl)propyne) and cross-linked poly(dimethylsiloxane) core and a polydimethylsiloxane and a poly(sils esquioxane) (PDMS/POSS), nafion (sulfonated tetraflouroethylene); one or more of co-polymers including: poly(dimethylsiloxane)-polyamide multiblock copolymer; copolymerizations of diphenylacetylenes having various silyl groups [PhC^CC6H4-R]; R ¼ p-SiMe3 (TMSDPA), p-SiEt3 (TESDPA), p-SiMe2-n-C8H17 (DMOSDPA), and p-SiPh3 (TPSDPA)]diphenylacetylene having a tert-butyl group (PhC^CC6H4-tertBu; TBDPA poly (TPSDPA-co-TBDPA, poly(TMSDPA-co-TBDPA), poly[1-(p-trimethylsilyl)phenyl-2-(p-trimethylsilyl) phenylacetylene]; amorphous fluoroplastic resins having polytetrafluoroethylene, Dimethylsilicone rubber, Dimethylsilicone oil, Fluorosilicone, Fluorosilicone oil; Nitrile rubber and PTFE.

3. The 3-D printer apparatus according to claim 1, wherein
the gas permeable liquid defining the first mobile layer includes one or more of the following group of materials: silicon oil with addition of solid oxygen permeable particles, silicon oil with addition of silicone containing polymers that enhance oxygen permeability including at least one inorganic material, metalloids, boron nitrides, metal oxides (including iron oxide, aluminum oxide, titanium dioxide, zirconium oxide) and metal sulfides, ZnS and CdS, 100-200 nm in size and 1-10% weight percentage of inorganic materials.

4. The 3-D printer apparatus according to claim 1, wherein
the polymerizable resin above the inhibition liquid is a photopolymer that includes one or more of the following group of materials: nylon, acrylic, styrene, acrylonitrile, polycarbonate, polystyrene, polyethylene, polypropylene, ABS, PVC homopolymer, PVC copolymer and aromatic polyurethane.

5. The 3-D printer apparatus according to claim 4, wherein
the inhibition liquid defining the second mobile layer is a polymer that is infused with oxygen that suppresses polymerization thereof.

6. The 3-D printer apparatus according to claim 5, wherein the polymer of the inhibition liquid includes the photopolymer of the polymerizable resin.

7. The 3-D printer apparatus according to claim 1, wherein
the bottom wall of the tank structure is made of a transparent material.

8. The 3-D printer apparatus according to claim 7, wherein
the resin curing device located below the tank and is located to selectively project light upward through the bottom wall of the tank structure.

9. The 3-D printer apparatus according to claim 1, wherein the third wall includes an outlet manifold that receives the gas permeable liquid and returns it to the reservoir.

10. The 3-D printer apparatus according to claim 9, wherein
the third wall includes at least one fluid movement device that draws the gas permeable liquid from the tank structure and urges it into the reservoir.

11. The 3-D printer apparatus according to claim 10, wherein
the at least one fluid movement device is an ejector pump that includes a compressed gas source that provide gas to a venturi tube drawing the gas permeable liquid upward from the outlet manifold of the third wall.

12. The 3-D printer apparatus according to claim 11, wherein
the compressed gas source is only compressed oxygen.

13. The 3-D printer apparatus according to claim 11, wherein
the electronic controller is further connected to the compressed air source such that the electronic controller controls the flow of compressed air into the venturi tube.

14. The 3-D printer apparatus according to claim 10, wherein
the at least one fluid movement device is a plurality of fluid movement devices that all draw the gas permeable liquid from the tank structure and into the reservoir.

15. The 3-D printer apparatus according to claim 1, wherein
the electronic controller is configured to position a lower surface of the object carrier within the printing area, and thereafter operate the resin curing device to cure predetermined portions of the polymerizable resin located within the printing area thereby forming a portion of an object along the lower surface of the object carrier.

16. The 3-D printer apparatus according to claim 15, wherein
the electronic controller is configured to re-position a lower surface of the object carrier a predetermined distance above the printing area such that the polymerizable resin flows into the printing area along a lower surface of the object, and thereafter operate the resin curing device to cure predetermined portions of the polymerizable resin located within the printing area under the object thereby forming a further portion of the object.

* * * * *